United States Patent Office 2,915,514
Patented Dec. 1, 1959

2,915,514

POLYMERIZATION PROCESS

George S. Denkowski, Texas City, Tex., assignor to Monsanto Chemical Company, St. Louis, Mo., a corporation of Delaware No Drawing. Application June 7, 1956
Serial No. 589,883

3 Claims. (Cl. 260—94.9)

This invention relates to the polymerization of ethylene. More particularly, it relates to improvements in the Ziegler process for the production of polyethylene, relating specifically to the use of toluene as a catalyst suspending medium in conjunction with the employment of methanol as the agent for quenching the catalyst.

There has recently come into commercial prominence a process whereby ethylene and other polymerizable hydrocarbons may be polymerized at low temperatures and pressures to yield products of high molecular weight superior in many respects to those produced by the high pressure techniques previously practiced in the art. This process has been made possible through the agency of a type of catalyst developed by Dr. Karl Ziegler of the Max Planck Institute at Mulheim, Ruhr, Germany, and has come to be commonly termed the "Ziegler process" while the products so produced are as commonly referred to as "Ziegler-type polymers." Many variations of the catalyst have been disclosed but probably the preferred group is that described in Belgian Patent No. 533,362, issued May 16, 1955, to Ziegler, the disclosure of which is incorporated herein by reference, namely, catalysts prepared by the interaction of a trialkylaluminum with a compound of a metal of group IV–B, V–B, or VI–B of the periodic system including thorium and uranium, and especially compounds of titanium, zirconium and chromium.

As the process is ordinarily conducted, the catalyst is suspended in a suitable liquid organic medium or inert solvent and ethylene is bubbled through the system at a temperature anywhere in the range from 0° to 100° C. Upon completion of the reaction, the polymer is recovered by first destroying the catalyst by quenching it with an alcohol and then separating the solid polymer from the reaction mixture by filtration or centrifugation. After the polymer is removed from the reaction mixture, it is washed with a suitable solvent in order to remove final traces of the reaction medium. Alkyl alcohols can be used for this purpose. After washing, the polymer is dried by any convenient method.

Various inert organic solvents have been proposed and utilized as suspending media for the catalyst, the more common and generally used solvent being kerosene. Such solvents can suitably be saturated aliphatic and alicyclic, and aromatic hydrocarbons, halogenated hydrocarbons, and saturated ethers. By way of example may be mentioned liquefied propane, isobutane, normal butane, n-hexane, the various isomeric hexanes, cyclohexane, methylcyclopentane, dimethylcyclohexane, dodecane, industrial solvents composed of saturated and/or aromatic hydrocarbons such as kerosenes, naphthas, etc., especially when hydrogenated to remove any olefinic compounds, and especially those ranging in boiling point up to 600° F. Also, benzene, toluene, ethylbenzene (very convenient in the case of polymerization of styrene as the separation of styrene from ethylbenzene used as a starting material for the production of styrene is unnecessary), cumene, decalin, ethylene dichloride, diethyl ether, dibutyl ether, and the like.

Likewise, in the quench step, various alcohols have been employed to destroy the catalyst so that the polymer may be separated from it. Any alcohol can be used for this purpose, although alkyl alcohols produce the best results. Alkyl alcohols containing from 1 to 8 carbon atoms are particularly desirable and alkyl alcohols containing from 3 to 8 carbon atoms are particularly preferred. Alcohols that can be used for this purpose are methyl alcohol, ethyl alcohol, propyl alcohol, n-butyl alcohol, isobutyl alcohol, tert.-butyl alcohol, butyl alcohol, hexyl alcohol, heptyl alcohol, n-octyl alcohol, isooctyl alcohol, 2-ethylhexyl alcohol, ethylene glycol, triethylene glycol, propylene glycol, benzyl alcohol and methyl phenyl carbinol. While the unsubstituted alcohols are particularly useful, these alcohols can, if desired, be substituted with one or more inert substituents.

Recent work has led to the surprising discovery that polyethylene having improved physical properties can be produced and real and distinct process advantages can be realized by employing a specific combination of catalyst suspending medium or inert solvent and quenching agent. Such a process has been described in my co-pending application, Serial No. 586,356, filed May 22, 1956, where a process is claimed for polymerizing ethylene in the presence of a Ziegler catalyst suspended in toluene and quenching the catalyst with methanol. In this application, it was also disclosed that polymer with optimum color values can be obtained if the filter cake of polyethylene during the recovery step is washed successively with toluene and with methanol. It has now been discovered that the toluene-methanol azeotrope obtained when the mixed solvents are separated by distillation to recover the toluene for recycle purposes serves as both an excellent quenching agent and a suitable washing liquid for the polymer filter cake. This makes it possible to "tie-in" the solvent recovery system with the polymerization system effecting an overall economy in equipment and operational steps. The utilization of this azeotropic mixture as such eliminates the necessity for splitting the toluene-methanol azeotrope with all the attendant equipment and process steps entailed in such a separation, a separation which otherwise would have to be made when toluene is recovered by fractionation from the mixed solvents for re-use.

It is an object of the invention, therefore, to provide an improvement in the Ziegler process for the production of polyethylene.

It is another object of the invention to provide an improvement in the process for the production of polyethylene wherein ethylene is polymerized in the presence of a Ziegler catalyst suspended in toluene and methanol is employed as the catalyst quenching agent.

It is another object of the invention to provide an improved polyethylene having superior physical properties such as higher density, better tensile strength, less permeability, and so forth, than those Ziegler polymers now known to the art.

These and other objects of the invention, which will become apparent from the following description and the appended claims, are accomplished by first polymerizing ethylene in the presence of a Ziegler-type catalyst suspended in toluene. After the polymerization has taken place and before the polymer is removed from the reation mixture, the toluene-methanol azeotrope obtained as described below is added to the reaction mixture to quench the catalyst. Polyethylene is then recovered from the resulting reaction mixture by filtration. The polymer filter cake is washed with more of the toluene-methanol azeotrope to free it of any residual reaction medium or catalyst residues. These washings are combined with the filtrate containing the catalyst residues, toluene, and methanol to make up what is termed the "mixed solvents" of the process. Hence, throughout this specification and in the appended claims the term "mixed solvents" refers to the mixtures resulting from the combination of the filtrate from the polymer recovery step and the washings from the polymer washing step. The mixed solvents are subjected to distillation to recover therefrom a pure toluene fraction suitable for recycle to the polymerization step. A toluene-methanol azeotrope is withdrawn during one stage of this distillation. This is used as the quenching agent and also to wash the filter cake.

The following example will illustrate the invention, but is presented only for this purpose and is not to be construed as limiting the invention in any manner except as it is limited in the claims.

*Example 1*

The polymerization reaction was carried out in a closed cylindrical glass reactor equipped with a dip tube, a stirrer, a dropping funnel, a thermometer, and gas inlet means to provide for flushing the reactor with an inert gas prior to introduction of the reactants and to maintain an inert atmosphere during the polymerization reaction itself. External heating and cooling was provided by means of a heating mantle and an ice bath fitter to the reactor.

The reactor was charged with about 1000 ml. of freshly distilled toluene ($H_2O$—3 p.p.m.) after it had been thoroughly dried and flushed with a hot nitrogen sweep gas for about 3 hours. To this by way of the dropping funnel was added 6.08 grams (7.78 ml.) of a 29.38% solution of triisobutylaluminum in kerosene. The dropping funnel was flushed with 100 ml. of toluene, charged with 3.42 grams of $TiCl_4$ (1.98 ml.), and this was then added drop-wise to the reactor with agitation. The funnel was again flushed with about 190 ml. of toluene. The mole ratio of triisobutylaluminum to titanium tetrachloride in the reactor was 0.501 and the catalyst concentration in the toluene was 0.46% by weight.

The catalyst mixture in the reactor was heated to 65° C. and ethylene was introduced into it through the dip tube for a period of about 58 minutes at a rate varying from about 850 cc. per minute to about 3000 cc. per minute. The reaction mixture was then cooled to about 55° C. and the catalyst was deactivated or quenched by adding to the reaction mixture 500 ml. of a toluene-methanol azeotrope (69% methanol–31% toluene by weight) obtained in the toluene recovery step as described below and heating the mixture to a temperature of about 64° C. for a period of approximately one hour. The reaction mixture was then cooled to about 20° C. and filtered in the absence of air. The filter cake of solid polymer was washed three times with 350-ml. portions of the same toluene-methanol azeotrope used for quenching. The filter cake was then oven dried at 60° C. and 60 mm. Hg. The yield of dry polyethylene was 78.0 grams.

The toluene-methanol azeotrope used for quenching and washing was obtained by subjecting to distillation the filtrate of catalyst residues, toluene, and methanol obtained by filtering the polymerization reaction mixture after quenching or deactivating the catalyst together with the wash liquid from washing of the filter cake. This mixture was fed into the intermediate section of a conventional packed fractionation column and the toluene-methanol azeotrope was removed overhead from the column. The bottoms from this column were further fractionated in a second column from which toluene, suitable for recycle as the catalyst suspending medium in the polymerization reaction, was recovered by conventional techniques.

In the original run or at the start-up of the process, of course, the filtrate for distillation is obtained when the reaction mixture resulting from polymerization using toluene as the catalyst suspending medium and methanol as the catalyst quenching agent is filtered. The filter cake is washed first with toluene and then with methanol and these washings are combined with the above filtrate. Thereafter, the azeotrope itself is used and recovered continuously.

In the table presented below, the major physical properties of the polyethylene obtained by the process of the invention (identified as sample A) are compared with those of a sample prepared under the same conditions using toluene as the catalyst suspending medium, methanol as the catalyst quenching agent and separate successive washes of the polymer with toluene and methanol (identified as sample B), and a sample prepared under the same conditions by conventional techniques in which kerosene is the solvent or catalyst suspending medium and isobutanol is employed both as the catalyst quenching agent and the liquid for washing the filter cake (identified as sample C).

| Sample | A | B | C |
| --- | --- | --- | --- |
| Melt Index | 2.2 | 2.2 | 0.45 |
| Memory | 102 | 96 | 53 |
| Color [1] | −8.8 | −5.5 | −1.7 |
| Grayness, percent | 82.9 | 83.6 | 76.9 |
| Density | 0.9527 | 0.9524 | 0.9434 |

[1] Determined by spectrophotometric means which measure degree of yellowness. The lower the value obtained, the less yellow is the sample. Satisfactory commercial material has a zero value.

It will be seen that the main improvements in physical properties over those of the conventional polyethylene obtained when toluene is used as the catalyst suspending medium and methanol for quenching and with washing of the filter cake successively with straight toluene and straight methanol are also obtained when the toluene-methanol azeotrope is used for quenching and washing.

In addition, this makes it possible to coordinate a solvent recovery system with the polymerization system using a minimum of equipment and fewer operational steps. In order to be economically feasible, the catalyst suspending medium must be recovered for re-issue in an extremely pure state. The toluene in this instance can be readily recovered by fractionation but in the fractionation it is necessary to remove a toluene-methanol azeotrope as one fraction. The fact that this can be used as such for quenching the catalyst means that another distillation train does not have to be supplied and operated to break this azeotrope and recover toluene and methanol separately. The discovery of the utility of this azeotrope, therefore, provides distinct process advantages otherwise not realizable.

Many variations may be made in the process of the invention without departing from the scope thereof. For example, the catalyst composition can be varied substantially from that described. In addition to the type catalyst disclosed in the examples in the Belgian Patent No. 533,362 mentioned earlier, other catalysts of the Ziegler type which differ in various ways from this one may be employed. For example, instead of or in addition to the aluminum trialkyls, catalysts of the type described in the Belgian patent can be made by reacting the various metal compounds of groups IV–B, V–B, and VI–B disclosed therein with aluminum compounds of the general formula $RAlX_2$, where R is hydrogen or hydrocarbon, X means any other substituent including hydrogen or hydrocarbon, particularly dialkyl or diaryl aluminum monohalides, also aluminum hydride, alkyl or aryl aluminum dihydrides, dialkyl or diaryl aluminum hydrides, alkyl or aryl aluminum dihydrides, alkyl or aryl aluminum dialkoxy or diaryloxy compounds, dialkyl or diaryl aluminum alkoxy or aryloxy compounds. Similarly, instead of or in addition to the organo-aluminum compounds, organic compounds of magnesium or zinc can be used and these can contain either one or two hydrocarbon radicals, those of special interest being Grignard compounds, magnesium dialkyls, mixed organo zinc compounds such as $C_2H_5ZnI$ and zinc dialkyls, all of these, of course, being reacted with compounds of groups IV–B, V–B, or VI–B metals.

Another Ziegler-type catalyst is prepared by the interaction of an aluminum compound of the general formula $R_2AlX$ where R is a hydrocarbon radical such as alkyl or aryl and X is a halogen, such as chlorine or bromine, with a compound of a metal of group VIII of the periodic system, such as iron, nickel, cobalt, platinum or manganese, for example, dimethylaluminum monobromide plus ferric chloride, diisobutylaluminum chloride plus nickel (trivalent) chloride, diethylaluminum monochloride plus manganic chloride. Yet another combination is that of group IV–B, V–B, or VI–B metal compounds with aluminum compounds of the general formula $R_2AlX$, where R is hydrogen or a hydrocarbon radical and X is the radical of a secondary amine, a secondary acid amide, a mercaptan, a thiophenol, a carboxylic acid, or a sulfonic acid, e.g., piperidyl diethylaluminum plus $TiCl_4$, dimethylamino-diethylaluminum plus zirconium tetrachloride, ethylmercaptodiethylaluminum plus $TiCl_4$. Another of the classes of Ziegler type polymerization catalysts comprises compounds of the group IV–B, V–B, or VI–B heavy metals as previously mentioned, combined with the alkali metal alkyls, for example, with lithium-, sodium-, or potassium methyl, -ethyl, -benzyl, -isobutyl, or with complex compounds of such alkali metal alkyls with organic compounds of aluminum, magnesium or zinc as mentioned above, or complex compounds of alkali metal hydrides with such organic compounds of aluminum, magnesium or zinc, for example, butyl lithium plus zirconium tetrachloride, sodium tetramethylaluminum plus titanium tetrachloride or plus thorium acetylacetonate. Still other Ziegler-type catalysts are prepared by using (in conjunction with compounds of group IV–B, V–B, or VI–B metals), instead of trialkylaluminums, triaryl-, triarylalkyl, trialkaryl-, or mixed alkyl- and aryl-aluminum, zinc, magnesium or alkali metals, e.g., phenyl sodium plus $TiCl_4$.

While the principal classes of Ziegler catalysts have been listed, this listing is not to be construed as complete, and various other such catalysts than those set forth may also be used in the process in which the improvement described in the present application is applicable. Thus, ethylene and other monomers can be polymerized by catalysts obtained by treating compounds of heavy metals, especially compounds of the group IV–B, V–B and VI–B metals, not with organo-metallic compounds but rather by reducing agents such as: alkali metals, e.g., lithium, sodium, potassium; alkali hydrides, e.g., lithium hydride, sodium hydride; complex alkali aluminum and alkali boron hydrides, e.g., lithium aluminum hydride; complexes of alkali metal hydrides with boron triaryls or boric acid esters or boronic acid esters; and especially titanium and zirconium halides reduced by zinc or alkaline earth metals or other earth metals including the rare earths, or hydrides of same; said reductions being effected in the complete absence of oxygen, moisture, and compounds containing active hydrogen atoms as determined by the Zerewitinoff method. Polymers of low to medium molecular weight can be obtained from ethylene and other monomers by using trialkylaluminums alone as catalysts, especially in very small amounts, as well as dialkyl berylliums, trialkyl galliums, trialkyl indiums, monoalkylaluminum dihydrides, and the various other catalysts disclosed by Ziegler in U.S. Patent No. 2,699,457. Attention is further directed to the teaching of various of the foregoing catalysts in Ziegler's Belgian Patents 534,792 and 534,888, the disclosures of which are hereby incorporated herein by reference. The essence of the present invention, however, is not to be found in the particular Ziegler-type polymerization catalyst employed in making the polymers in question, but rather in the use of a toluene-methanol azeotrope as the catalyst quenching agent and washing liquid for the filter cake in a polymerization process where the catalyst is suspended in toluene.

The preferred catalysts are prepared by the interaction of (a) an aluminum compound of the general formula $R_2AlX$ wherein R is an alkyl, cycloalkyl, or aryl radical and X is hydrogen, halogen, or an alkyl, cycloalkyl, or aryl radical with (b) a metal halide selected from the group consisting of the chlorides, bromides, and iodides of titanium and zirconium.

By way of example, but not limitation, the following suitable aluminum compounds are mentioned:

Triethylaluminum
Triisobutylaluminum
Trioctylaluminum
Didodecyloctylaluminum
Diisobutylaluminum hydride
Tridodecylaluminum
Diphenylaluminum bromide
Dipropylcyclohexylaluminum
Ditolylmethylaluminum
Tri-($\beta$-phenylethyl)aluminum
Diethylaluminum chloride
Diisobutylaluminum chloride
Diisobutylaluminum iodide
Di-($\beta$-cyclohexylpropyl)isobutylaluminum It is to be understood that mixtures of the foregoing types of aluminum compounds can be employed. One can use the total reaction mixtures obtained in the formation of such compounds, e.g., by treatment of metallic aluminum with alkyl halides resulting in the formation of such mixtures as $R_2AlCl$ plus $RAlCl_2$, termed alkylaluminum sesquihalides.

The aluminum compounds in question are interacted with one or more chlorides, bromides or iodides of titanium or zirconium, the chlorides and iodides being preferred. The titanium or zirconium in these halides should be in a valence form higher than the lowest possible valence. The tetrahalides are especially preferred, although, the dihalides, trihalides, mixtures of di-, tri- and tetrahalides, etc., can be used. Preferred titanium or zirconium compounds are those that are soluble in the organic solvent (preferably a hydrocarbon such as hexane, benzene, kerosene, etc.) that is used in preparing the catalyst. Titanium or zirconium compounds other than the named halides, e.g., those called alcoholates, alkoxides or esters by various investigators such as titanium tetramethoxide (also called tetramethyl titanate), titanium triethoxide, tripropoxytitanium chloride, zirconium tetra-n-butoxide, or fluorides of titanium or zirconium, or complexes such as zirconium acetaylacetonate, $K_2TiF_6$, or salts of organic acids such as the acetates, benzoates, etc., of titanium and zirconium, can be used to prepare catalysts with at least some activity and to that extent can be considered equivalents of the halides. However, such compounds are usually prepared from the halides and, hence, are more costly, and also are usually less active, so their use is economically sound only where in a particular situation, favorable effects can be obtained such as increased solubility in the organic solvent that is used in preparing the catalyst, or polymer of increased molecular weight, or faster reaction rate. Although the exact action resulting from contacting the aluminum compound with the titanium or zirconium compound is not understood, it is believed likely that the zirconium or titanium halide is reduced in valence by the reaction of the added aluminum compound. The mol ratio of aluminum compound to titanium (or zirconium) compound, or stated another and simpler way, the mol ratio of aluminum to titanium (or zirconium), can vary over a wide range, suitable values being from 0.3:1 to 10:1 on up to 15:1 or higher. It is generally preferred to use an Al:Ti mole ratio between 1:3 and 5:1. The same ratios apply in the case of zirconium compounds.

While active catalysts can be prepared by a variety of procedures, the simplest and perhaps most effective is to add the titanium or zirconium halide to the aluminum compound, preferably in the presence of comparatively small amounts of an inert organic solvent used as the catalyst suspending medium. The reverse order of addition of reactants can also be used. The quantity of solvent used in the reaction mixture is subject to substantial variation. The amount of the solvent may be kept low in the reaction mixture, such as from 0.1 to 0.5 part by weight of inert organic solvent (i.e., inert to the reactants and catalyst under the conditions employed), per part by weight total polymer produced. However, it is often helpful in obtaining sufficient contact between monomer and catalyst and in aiding removal of heat of reaction to employ larger amounts of solvent, for example, from 5 to 30 parts by weight of solvent per part by weight of total polymer produced.

The amount of catalyst required is comparatively small. Amounts as small as 0.01 weight percent based on total weight of monomer charged are sometimes permissible, although it is usually desirable to use in the neighborhood of 0.1 to 5.0 percent. Larger amounts up to, say, 20 percent or higher are also satisfactory.

The ethylene is contacted with the catalyst in any convenient manner, preferably merely by bringing the catalyst and monomer together with intimate agitation provided by suitable stirring or other means. The agitation can be continued during the polymerization, or the polymerization mixture can be allowed to remain quiescent while the polymerization takes place.

The polymerization reaction can be effected over a wide range of temperatures, such as from 0° C. to 100° C. and higher if desired. It is seldom advantageous, however, to exceed temperatures of about 70° C. during the polymerization reaction, and room temperature (25° C.) is quite satisfactory.

The reaction is suitably carried out at atmospheric pressure or higher. Although sub-atmospheric pressures are permissible, there would seldom be any advantage in their use. Pressures ranging from atmospheric up to several hundred or even many thousand pounds per square inch, e.g., 50,000 p.s.i. and higher, are suitable. While it is not necessary to use the higher pressures in order to obtain reaction, they will have at times a desirable effect on reaction rate and in some instances on polymer quality. The choice of whether or not to use an appreciably elevated pressure will be one of economic and practical considerations, taking into account the advantages that can be gained thereby.

After the polymerization reaction is complete, prior to the separation of the polymer from the reaction mixture and before any catalyst poisons have contacted the catalyst, the catalyst is destroyed by adding the toluene-methanol azeotropic mixture to the reaction mixture. While the amount of the azeotrope to be used is subject to wide variation, it is necessary in order to obtain thorough intermixture to use a considerable excess over that theoretically required to react with any catalyst residue in the polymer. Thus enough of the toluene-methanol azeotrope is added to ensure that the proportion of methanol to catalyst present is about 2 to about 200 moles per mole of catalyst. It is generally preferred to use a quantity of the azeotrope such that the weight of the methanol represented therein is several times the weight of the polymer being treated. A sufficient amount of the mixture to form a readily stirrable slurry is desirable. The destruction of the catalyst may be effected over the wide range of temperatures from 0° C. to about 100° C. The toluene-methanol azeotropic mixture may be added at reaction temperature (65–70° C.), or the reaction mixture may be cooled, the azeotrope added, and the whole mixture again heated to reaction temperature or higher. Preferably, the quenching step is conducted at a temperature in the range from about 50 to about 70° C. and there is some advantage in maintaining the quenched mixture at around 64° C., the boiling point of the toluene-methanol azeotrope quenching agent. Quenching may be accomplished in as short a time as 15 minutes or it may require as long as 1.5 hours, depending upon the conditions employed. Usually from 30 to 60 minutes are satisfactory. While the quenching is usually done at atmospheric pressure, there is no reason why elevated pressures could not be used if desired. If higher pressures are used, temperatures will vary accordingly.

After the catalyst destruction is complete, the polymer can be removed from the reaction mixture by any convenient method and this is best accomplished by filtration and preferably in the absence of air. After the polymer is removed from the reaction mixture, the polymer is washed with the same toluene-methanol azeotrope used for quenching. After it is thoroughly washed, the polymer is then dried by any convenient method.

The toluene-methanol azeotrope is obtained by subjecting the mixed solvents of the process to fractional distillation employing techniques well known to the art. Two columns will suffice with the first column being operated to recover the toluene-methanol azeotrope overhead after feeding the mixed solvents into the intermediate section. The bottoms stream from this column may then be further purified by feeding it into a second column for rectification to recover a pure toluene fraction. If desired, however, more columns may be employed. The distillation may be batch or continuous and no special precautions are required except that the amount of water in the azeotrope must be rigidly controlled. Some water is produced in the quenching reaction and small amounts are occasionally unavoidably picked up from the air in the processing of the mixed solvents. Water has a decidedly adverse effect on polymer quality even in very small quantities. Amounts in excess of 400 parts of water per million parts of solvent cannot be tolerated and hence the water content of the toluene-methanol azeotrope should be kept under this maximum allowable concentration. This can be readily accomplished, however, by careful adjustment of the reflux ratio in the fractionation column.

What is claimed is:

1. An improved process for the production of polyethylene which comprises polymerizing ethylene in the presence of a catalyst prepared by the interaction of a trialkylaluminum with titanium tetrachloride, said catalyst being suspended in toluene, quenching the catalyst after the polymerization has taken place and before any substantial removal of the polymer from the reaction mixture by adding the toluene-methanol azeotrope obtained from the distillation of the mixed solvents of the process to the reaction mixture, recovering polyethylene from said reaction mixture by filtration, washing the polymer filter cake with another portion of the same toluene-methanol azeotrope used for quenching the catalyst, combining the washing liquid with the filtrate obtained in the polymer removal step to form the mixed solvents of the process, subjecting said mixed solvents to distillation to recover therefrom a toluene-methanol azeotrope fraction and a pure toluene fraction suitable for recycling to the polymerization reaction.

2. An improved process for the production of polyethylene which comprises polymerizing ethylene in the presence of a catalyst prepared by the interaction of a triisobutyl aluminum with titanium tetrachloride, said catalyst being suspended in toluene, quenching the catalyst at a temperature within the range from about 0° to about 100° C. after the polymerization has taken place and before any substantial removal of the polymer from the reaction mixture by adding the toluene-methanol azeotrope obtained from the distillation of the mixed solvents of the process to the reaction mixture, recovering polyethylene from said reaction mixture by filtration, washing the polymer filter cake with another portion of the same toluene-methanol azeotrope used for quenching the catalyst, combining the washing liquid with the filtrate obtained in the polymer removal step to form the mixed solvents of the process, subjecting said mixed solvents to distillation to recover therefrom a toluene-methanol azeotrope fraction and a pure toluene fraction suitable for recycling to the polymerization reaction.

3. An improved process for the production of polyethylene which comprises polymerizing ethylene in the presence of a catalyst prepared by the interaction of a triisobutyl aluminum with titanium tetrachloride, said catalyst being suspended in toluene, quenching the catalyst at a temperature within the range from about 50° to about 70° C. after the polymerization has taken place and before any substantial removal of the polymer from the reaction mixture by adding the toluene-methanol azeotrope obtained from the distillation of the mixed solvents of the process to the reaction mixture, recovering polyethylene from said reaction mixture by filtration, washing the polymer filter cake with another portion of the same toluene-methanol azeotrope used for quenching the catalyst, combining the washing liquid with the filtrate obtained in the polymer removal step to form the mixed solvents of the process, subjecting said mixed solvents to distillation to recover therefrom a toluene-methanol azeotrope fraction and a pure toluene fraction suitable for recycling to the polymerization reaction.

References Cited in the file of this patent

UNITED STATES PATENTS

| | | |
|---|---|---|
| 2,728,758 | Field et al. | Dec. 27, 1955 |
| 2,832,759 | Nowlin et al. | Apr. 29, 1958 |

FOREIGN PATENTS

| | | |
|---|---|---|
| 533,362 | Belgium | May 15, 1955 |